(12) United States Patent
Gruberman et al.

(10) Patent No.: US 8,817,761 B2
(45) Date of Patent: Aug. 26, 2014

(54) SYSTEM AND METHOD FOR REMOTELY CONTROLLING FEATURES OF WIRELESS MOBILE DEVICES

(76) Inventors: Randal Gruberman, Aurora, IL (US); Eric Carlton, Chicago, IL (US)

( * ) Notice: Subject to any disclaimer, the term of this patent is extended or adjusted under 35 U.S.C. 154(b) by 317 days.

(21) Appl. No.: 13/219,857

(22) Filed: Aug. 29, 2011

(65) Prior Publication Data

US 2013/0051378 A1 Feb. 28, 2013

(51) Int. Cl.
*H04W 4/00* (2009.01)
*G06F 15/173* (2006.01)

(52) U.S. Cl.
USPC ............... 370/338; 709/224; 709/225

(58) Field of Classification Search
USPC ..................................... 370/338
See application file for complete search history.

(56) References Cited

U.S. PATENT DOCUMENTS

| | | | |
|---|---|---|---|
| 7,975,048 B2 * | 7/2011 | Saunderson et al. | 709/224 |
| 2009/0235354 A1 * | 9/2009 | Gray et al. | 726/22 |

* cited by examiner

*Primary Examiner* — Afshawn Towfighi
(74) *Attorney, Agent, or Firm* — Husch Blackwell LLP (57) ABSTRACT

Systems and methods of controlling features of a wireless mobile device are provided. The method includes receiving a signal, the signal including a MAC OUI and serial number carried therein, determining if the features of the wireless mobile device are in a correct state in accordance with the MAC OUI and serial number, and when the features of the wireless mobile device are not in the correct state, modifying at least one feature of the wireless mobile device in accordance with the MAC OUI and serial number.

32 Claims, 3 Drawing Sheets

SYSTEM AND METHOD FOR REMOTELY CONTROLLING FEATURES OF WIRELESS MOBILE DEVICES

FIELD OF INVENTION

The present invention relates generally to wireless mobile devices. More particularly, the present invention relates to systems and methods for remotely controlling features of wireless mobile devices.

BACKGROUND

Wireless mobile devices are virtually ubiquitous in current society. For example, many people carry a wireless mobile device while performing everyday activities such as working, traveling, running errands, and engaging in recreational activities. Wireless mobile devices can be any type of cellular mobile device, for example, a mobile phone, personal digital assistant, smart phone, and the like.

Many wireless mobile devices include a variety of features, for example, RF transmissions, audible tones, backlit screens, cameras, recording, texting, and internet capabilities. However, in certain environments, it is advantageous and sometimes even required for some features of a wireless mobile device to be enabled or disabled.

For example, in an automobile, non-hands free features can distract drivers and endanger the lives of the driver as well as others in the vicinity. Therefore, it is advantageous to disable the non-hands free features and enable the hands free features of a driver's wireless mobile device. In some municipalities, laws even mandate the use of only hands free features, if any.

In other environments, for example, hospitals and airplanes, the Federal Communications Commission requires that devices do not emit any RF signals. Thus, the ability to transmit RF signals must be disabled. In still other environments, for example, movie theaters and classrooms, features such as audible tones, brightly lit backlit screens, cameras, and recording capabilities can interfere with people's concentration, privacy, and enjoyment of their surroundings. Thus, it is desirable to disable these features.

Wireless communication jammers that block all communication functions of wireless mobile devices are undesirable. Therefore, when located in environments where it is required or advantageous to enable or disable certain features of a wireless mobile device, it has traditionally been a user's responsibility to take the appropriate action. However, often users forget or do not care to enable or disable the prohibited features.

There is thus a continuing, ongoing need for systems and methods for remotely controlling features of wireless mobile devices.

SUMMARY

A system and method are provided in which executable software will run on the operating platform of a mobile device. When the software is running, the device can detect a Media Access Control (MAC) Organizationally Unique Identifier (OUI) and a serial number in a received signal. Based the MAC OUI and serial number recognized by the device, the device can determine which device features should be modified.

However, before modifying any device features, the device can store a current state of the device features. Then, the device can modify the appropriate device features. When the device no longer recognizes the MAC OUI and serial number, for example, because the device is out of a certain range, the device can again modify the appropriate device features by returning those features to the previously stored current state.

One embodiment of the method described herein includes controlling features of a wireless mobile device. The method can include receiving a signal with a predetermined MAC OUI and a serial number carried therein, determining if the features of the wireless mobile device are in a correct state in accordance with the received MAC OUI and serial number, and when the features of the wireless mobile device are not in the correct state, modifying at least one feature of the wireless mobile device in accordance with the received MAC OUI and serial number. In some embodiments, the method can also include determining if the MAC OUI and serial number in the received signal are recognized.

According to some embodiments, the method can include prompting a user to modify the least one feature of the wireless mobile device in accordance with the received MAC OUI and serial number before modifying the at least one feature of the wireless mobile device in accordance with the received MAC OUI and serial number. Prompting the user can include notifying the user of a surrounding environment and notifying a user of restrictions in the surrounding environment.

In some embodiments, the method can include storing a state of the features of the wireless mobile device before modifying the at least one feature of the wireless mobile device in accordance with the received MAC OUI and serial number. The method can also include periodically receiving the signal with the MAC OUI and serial number, determining when the signal with the MAC OUI and serial number is not received within a predetermined period of time, and when the signal with the MAC OUI and serial number is not received within the predetermined period of time, re-modifying the at least one feature of the wireless mobile device. Re-modifying the at least one feature of the wireless mobile device can include reverting the at least one feature to the stored state of the at least one feature.

The method in accordance with some embodiments can include prompting a user to re-modify the at least one feature of the wireless mobile device, and prompting the user can include notifying the user of a surrounding environment and notifying the user of a lack of restrictions in the surrounding environment.

In some embodiments, modifying the at least one feature of the wireless mobile device in accordance with the received MAC OUI and serial number can include enabling the at least one feature or disabling the at least one feature. Modifying the least one feature of the wireless mobile device in accordance with the received MAC OUI and serial number can also include providing at least one of advertising materials, coupons, marketing materials, and surveys to a user of the wireless mobile device.

The MAC OUI and/or the serial number can include a twelve-digit hexadecimal number. Receiving the signal can include receiving a GPS location of the wireless mobile device or receiving triangulation data from a plurality of cellular towers in range. In some embodiments, the method can include overriding the modification of the at least one feature of the wireless mobile device or prohibiting overriding in the absence of an emergency situation.

According to another embodiment, a method of controlling features of a wireless mobile device is provided. This method can include determining a transmission mode, determining one or more MAC OUI and serial numbers corresponding to the transmission mode, and transmitting a signal with the one or more serial numbers carried therein. Transmitting the signal can include transmitting a Bluetooth signal, WiFi signal, or transmitting a signal with a unique MAC OUI and serial number carried therein.

In some embodiments, determining the transmission mode can include determining a surrounding environment. Determining the transmission mode can also include determining a device class and/or controlling transmission of the signal according to parameters of the surrounding environment or determining a transmission radius based on the surrounding environment. The device class can be the type or class of transmission device.

In accordance with another embodiment, a transmission device is provided. The transmission device can include a transmitter, executable control software stored on a non-transitory computer readable storage medium, and at least one programmable processor for determining a transmission mode of the transmitter, determining one or more MAC OUI and serial numbers corresponding to the transmission mode, and providing a signal to the transmitter for transmission, the signal including the one or more MAC OUI and serial numbers carried therein. The transmitter can transmit a Bluetooth signal or a signal with a MAC address carried therein.

In some embodiments, the transmission device can include a user-operable input device for selecting the transmission mode of the transmitter. The transmission device can also include a power supply and a database for storing the one or more MAC OUI and serial numbers. In some embodiments, the programmable processor can retrieve the one more MAC OUI and serial numbers from the database based on the transmission mode of the transmitter.

Each of the one or more MAC OUI and serial numbers can correspond to controlling a predetermined feature of a remote wireless mobile device. Further, the transmission mode or device class of the transmitter can correspond to a transmission radius of the transmitter.

DESCRIPTION OF THE PREFERRED EMBODIMENTS

While this invention is susceptible of an embodiment in different forms, the drawings and description herein show and describe in detail specific embodiments thereof with the understanding that the present disclosure is to be considered as an exemplification of the principles, of the invention. The drawings and description herein are not intended to limit the invention to the specific illustrated embodiments.

Embodiments described herein include systems and methods for remotely controlling features of wireless mobile devices. Preferably such systems and methods remotely transmit signals to wireless mobile devices to enable or disable certain features of the devices.

A control apparatus used in this combination may include a transmission device for transmitting signals. In some embodiments, the transmission device can be owned, operated, and employed by a facility owner or operator, for example, a school teacher, airline crew, store operator, theater operator or others who wish or need to control the operation of wireless mobile devices within a particular facility.

The transmission device can be portable or not portable. For example, the transmission device can be permanently fixed in an automobile or airplane. Alternatively, the transmission device can be plugged into an outlet in a classroom or movie theater.

In accordance with some embodiments, transmission devices may utilize Bluetooth, Global Positioning, and/or Geo-location tracking technology to control certain features of a wireless mobile device in a defined area without inhibiting the complete functionality of the device. It is to be understood that this listing of technologies is not intended to be exhaustive.

The ability to control features of a device can depend on the location of the device so that features of the device are enabled or disabled in accordance with the surrounding environment. For example, a transmission device can act as a beacon and transmit a signal. The signal transmitted by the transmission device can be a digital signal and can include a Media Access Control (MAC) Organizationally Unique Identifier (OUI) and serial numbers therein.

In some embodiments the MAC OUI and/or the serial number can include a twelve-digit hexadecimal number, which is comprised of two parts. The first 6 digits can include the OUI or a company identifier, and the last 6 digits can include a serial number. Each OUI can have approximately 16 million serial numbers, and the recognized unique OUI and unique serial number(s) can determine which function(s) of a device to modify. Enabling or disabling different functions can correspond to different and unique twelve-digit hexadecimal numbers.

The MAC OUI and serial number carried in the signal transmitted by the transmission device can vary according to the specific environment in which the transmission device is located and according to the specific features the transmission device intends to control. For example, a MAC OUI and serial number carried in a signal can be unique to a specific environment or facility and can be unique to the control of a specific wireless mobile device feature.

Wireless mobile devices in range of the transmission device can receive the signal from the transmission device. Then, the wireless mobile devices can detect the MAC OUI and serial number carried in the received signal and enable or disable certain features of the mobile device. The device features that are enabled or disabled can be determined by the MAC OUI and serial number carried in the signal received from the transmission device.

In some embodiments, when a wireless mobile device detects a signal from a transmission device, the mobile device can prompt a user to manually enable or disable certain features of the mobile device. When the user does not comply with the prompt, for example, within a predetermined period of time or after a predetermined number of prompts, the mobile device can automatically enable or disable the appropriate feature(s).

Figure 1:
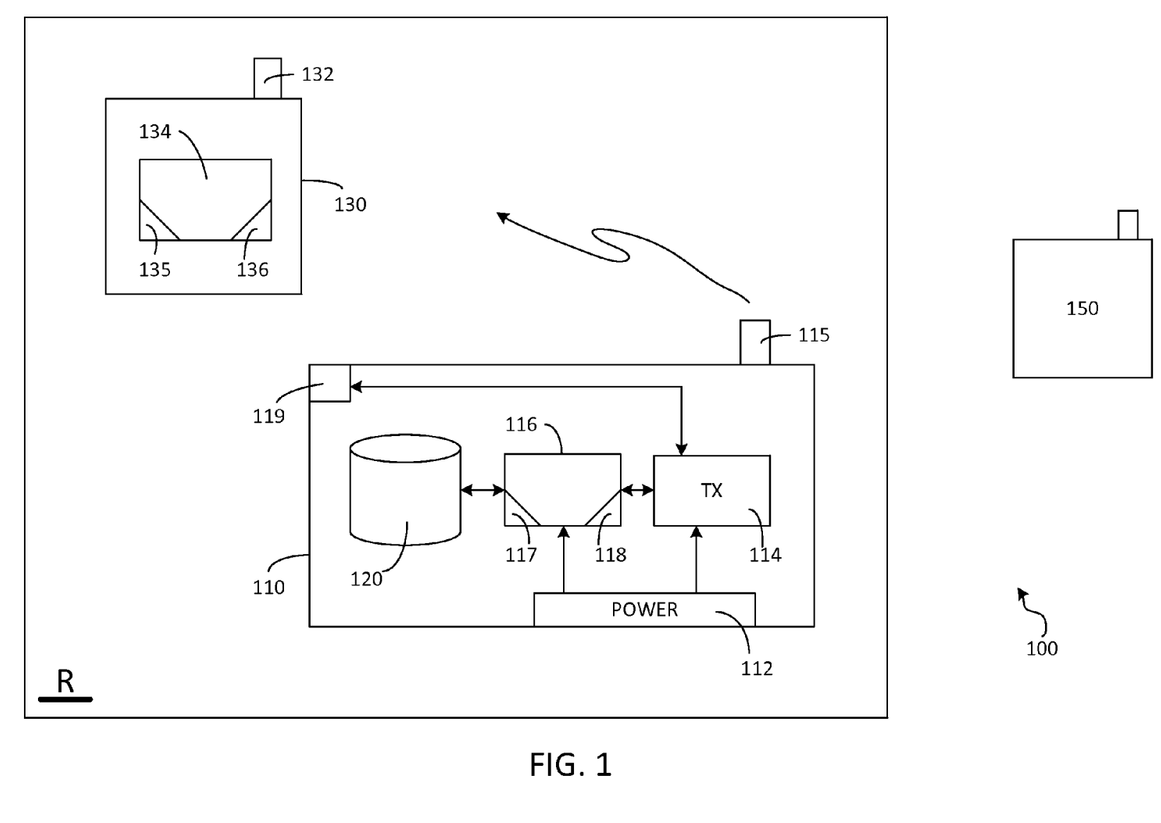
FIG. 1 is a block diagram of a system in accordance with the present invention.

FIG. 1 shows a block diagram of a system 100. As seen in FIG. 1, the system 100 can include a control apparatus, for example, a transmission device 110 and a wireless mobile device 130 in a region R.

The transmission device 110 can include a power source 112, for example a DC power source between 2 and 12 volts. A dry cell is one such power source. In some embodiments, the device 110 can plug into an external outlet or power receptacle that supplies power to the device 110. For example, the external outlet can be a 120 volt AC outlet. In either embodiment, power from the power source 112 or the external power supply can provide power to a transmitter 114 and control circuitry 116 in the device 110. The transmitter 114 can communicate with the control circuitry 116, and the control circuitry 116 can access a database 120. In some embodiments, the transmitter 114 and/or the control circuitry 116 can be implemented with a printed circuit board.

In embodiments, the control circuitry 116 can include one or more programmable processors 117 and executable control software 118 as would be understood by those of skill in the art. The executable control software 118 can be stored on a transitory or non-transitory local computer readable medium.

The database 120 can store one or a plurality of addresses or MAC OUI and serial numbers. For example, the database 120 can store one or a plurality of different Media Access Control (MAC) addresses. In some embodiments, each MAC address can correlate to the control of a different feature of a wireless mobile device. In other embodiments, a single MAC address can correlate to the control of a plurality of features of a wireless mobile device. The database may be stored in any convenient portable storage medium, including, without limitation, RAM, ROM, flash memory, and the like.

Various features of a wireless mobile device can be controlled in accordance with systems and methods described herein. For example, a MAC OUI and serial number carried in a signal received by a wireless mobile device can correspond to the control of the following features: texting, audible ring tones and alerts, silent or vibrate mode, handset speaker, voice dialing, Bluetooth connectivity, keypad, brightly backlit screen, dimly backlit screen, wireless transmission capabilities, and non-essential preinstalled or third party applications, for example, instant messaging applications, social networking applications, game, internet surfing applications, and the like. It is to be understood that this list is exemplary only. Any and all features of a wireless mobile device can, be controlled and modified in accordance with these the present systems and methods.

The transmitter 114 can act as a beacon. When receiving power, the transmitter 114 can transmit a signal, for example, a Bluetooth signal, with one or a plurality of addresses or MAC OUI and serial numbers carried therein. The transmitter 114 can transmit signals via, for example, an antenna 115 of the device 110. For example, the control circuitry 116 can access the database 120 to retrieve a MAC OUI and serial number(s), and the control circuitry 116 can communicate the retrieved MAC OUI and serial number(s) to the transmitter 114, which can broadcast a signal with the MAC OUI and serial number(s) carried therein via an antenna 115.

In some embodiments, the transmission device 110 can be controlled by environmental parameters of the environment in which the device 110 is located. For example, the transmission device 110 can be programmed so that when the transmission device 110 is located in an automobile, the transmitter 114 transmits signals only when the speed of the automobile has reached a predetermined threshold. In these embodiments, the transmission device 110 can determine the speed of the automobile by, for example, communicating with the automobile's speedometer.

In some embodiments, the transmitter 114 can function in one of a plurality of different modes corresponding to transmission distances. For example, the transmitter 114 can function in a first mode that corresponds to transmitting signals in an approximately 100 meter radius. The transmitter 114 can also function in a second mode that corresponds to transmitting signals in an approximately 10 meter radius, and in a third mode that corresponds to transmitting signals in an approximately 1 meter radius. In the various embodiments, the transmitting device 110 can include a switch or other user-operable device 119 to select the mode of the transmitter 114. As seen in FIG. 1, the switch 119 can communicate with the transmitter 114.

The mode of the transmitter 114 can vary according to the environment in which the transmission device 110 is located, including features of the environment in which the device 110 is located such as the environment's layout, location, and size. For example, if the device 110 is placed in an automobile, the transmitter 114 can be set to a third mode in which the transmitter 114 transmits signals in an approximately 1 meter radius. Thus, when in the third mode, the range of transmission from the transmitter 114 can be limited to the driver of the automobile. Passengers in the automobile need not receive signals from the transmitter 114 and need not restrict any features of their mobile devices.

Similarly, if the device 110 is placed in an airplane, classroom, or movie theater, the transmitter 114 can be set to a first mode in which the transmitter 114 transmits signals in an approximately 100 meter radius. Thus, when in the first mode, the range of transmission of the transmitter 114 ensures that all occupants of the airplane, classroom, or theater receive signals from the transmitter 114 so that features of each of their mobile devices can be restricted in accordance with the particular environment.

In some embodiments, the mode of the transmitter 114 can determine which and/or how many MAC OUI and serial numbers are carried in the signal transmitted by the transmitter 114. Furthermore, which and/or how many MAC OUI and serial numbers are carried in the signal transmitted by the transmitter 114 can determine which features of a wireless mobile device are controlled.

For example, when the transmitter 114 is set to a third mode based on its location in an automobile, the transmitter 114 can transmit signals with first and second MAC OUI and serial numbers carried therein. The first MAC OUI and serial number can correspond to disabling non-hands free features of a wireless mobile device, and the second MAC OUI and serial number can correspond to enabling hands free features of the wireless mobile device. Alternatively, the transmitter 114 can transmit signals with a third MAC OUI and serial number carried therein. The third MAC OUI and serial number can correspond to both disabling non-hands free features and enabling hands free features of the wireless mobile device.

When the transmitter 114 is set to a first mode based on its location in an airplane, classroom, or movie theater, the transmitter 114 can transmit signals with fourth and fifth MAC OUI and serial numbers carried therein. For example, the fourth MAC OUI and serial number can correspond to disabling RF transmissions or audible tones of a wireless mobile device, and the fifth MAC OUI and serial number can correspond to enabling an airplane, silent, or vibratory mode of a wireless mobile device. Alternatively, the transmitter 114 can transmit signals with a sixth MAC OUI and serial number carried therein. The sixth MAC OUI and serial number can correspond to both enabling and disabling: disabling RF transmissions or audible tones and enabling an airplane, silent, or vibratory mode of a wireless mobile device. In the various embodiments, the control circuitry 116 can assess the mode of the transmitter 114, retrieve a corresponding MAC OUI and serial number from the database 120, and provide that MAC OUI and serial number to the transmitter 114 for carrying in a signal.

Although a few examples have been given, it is to be understood that the transmitter 114 can transmit signals with any number of MAC OUI and serial numbers carried therein. For example, the transmitter can transmit signals with one or a plurality of different MAC OUI and serial numbers carried therein. Each MAC OUI and serial number can correspond to the control of a different wireless mobile device feature.

As explained above, the transmission device 110 can send signals to a wireless mobile device 130 in the region R. The region R can correspond to the radius of transmission of the transmission device 110. The mobile device 130 in the region R can receive signals from the transmission device 110 and control features of the device 130 accordingly.

However, a mobile device 150 outside of the region R is out of the transmission range of the transmission device 110. Accordingly, the mobile device 150 does not receive signals from the device 110, and features of the mobile device 150 will not be controlled in accordance with signals from the device 110.

It is to be understood that more than one wireless mobile device can be in the region R and can receive signals from the transmission device 110. For example, any number of mobile devices can be in the region R, receive signals from the transmission device 110, and control features of the mobile device accordingly. In this manner, facility owners or operators can control the features of multiple wireless mobile devices. Preferably, the receipt of signals from the transmission device 110 and the control of a mobile device in the region R are independent of any other mobile device in the region R.

The wireless mobile device 130 can include components of known mobile devices as would be understood by those of ordinary skill in the art. In addition, the device 130 can include an antenna 132 that detects signals from the transmission device 110. The antenna 132 can then provide the detected signal to control circuitry 134 in the device 130.

In embodiments, the control circuitry 134 can include one or more programmable processors 135 and executable control software 136 as would be understood by those of skill in the art. The executable control software 136 can be stored on a transitory or non-transitory local computer readable medium.

The control circuitry 134 and programmable processors 135 may illustratively execute the control software 136 on a continuous loop in the background of a normal operating platform of the wireless mobile device 130. Accordingly, once the control software is installed on a device 136, user action is not required for the device 130 to detect and recognize MAC OUI and serial numbers in signals received from a transmitting device 110 and to modify features of the device 130 accordingly. For example, the control software 136 can enable the antenna 132 of the device 130 to search for a signal from a transmitting device, for example, the device 110. The control software 136 can also be programmed to detect and recognize predetermined addresses or MAC OUI and serial numbers carried in received signals.

In some embodiments, the control software 136 can be installed on a wireless mobile device by the manufacturer of the device. In other embodiments, the control software 136 can be downloaded onto a wireless mobile device by a user of the device. For example, the control software 136 can be embodied in a downloadable application.

The control software 136 can enable the antenna 132 of the device 130 to receive signals from the transmitting device 110. In some embodiments, the control software 136 can prevent the antenna 132 from transmitting signals to the transmitting device 110 so as to prevent the device 130 from connecting or pairing with the transmitting device 110.

As is known in many technologies, such as Bluetooth, two devices need to be paired to communicate with each other. Pairing is often desired to protect private data that is being transmitted or to limit which devices can be controlled. However, in the present systems and methods, the transmitting device 110 need not pair with a wireless mobile device 130 for the device 130 to receive signals from the transmitting device 110. By not pairing with the transmitting device 110, the wireless mobile device 130 can conserve power in the power supply 112, can prevent the time consuming operation of saving information about the transmitting device 110 in memory, and can prevent security breaches. For example, when the device 130 is not paired with the transmitting device 110, there is no opportunity for a hacker to access sensitive information stored on the device 130.

In some embodiments, the control software 136 can be executed at a predetermined time interval. This can also conserve power in the power supply 112.

Illustratively, the control software 136 can be updated at any time. For example, the wireless mobile device 130 can receive downloads or updates to the software 136 via a cellular network.

It is to be understood that all wireless mobile devices in range of the transmitting device 110 can receive signals from the device 110. However, not all wireless mobile devices in range of the transmitting device 110 can detect and recognize MAC OUI and serial numbers carried in signals from the transmitting device 110. Accordingly, not all wireless mobile devices within range of the transmitting device 110 can control its features in accordance with the present systems and methods. For example, wireless mobile devices should include the control software 136 to detect and recognize MAC OUI and serial numbers carried in signals received from the transmitting device 110. If a wireless mobile device is in range of the transmitting device 110 but does not include the control software 136, then the wireless mobile device will not be affected by any signal received from the device 110.

Figure 2:
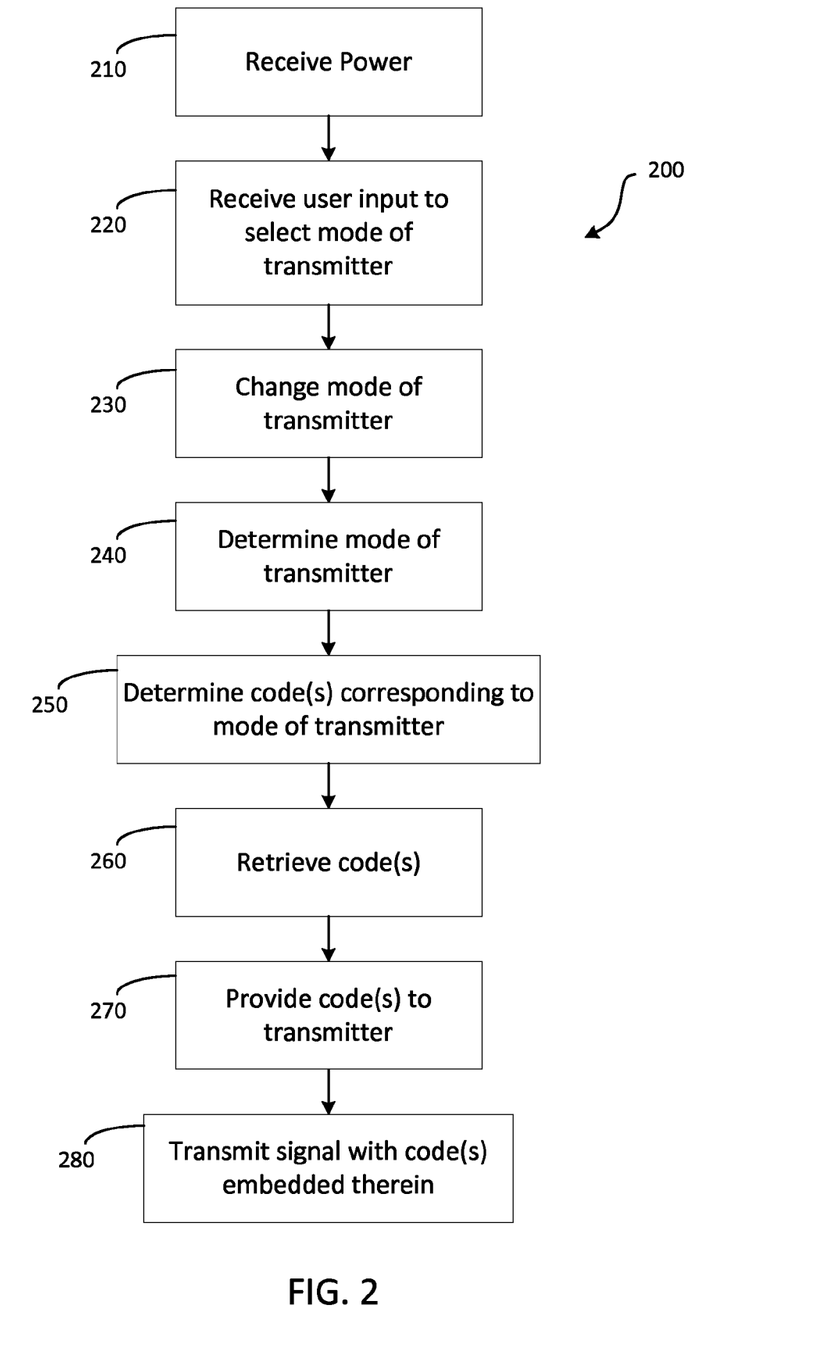
FIG. 2 is a flow chart of a method of transmitting a signal in accordance with the present invention.

FIG. 2 is a flow chart of a method 200 of transmitting a signal in accordance with the present invention. A transmitting device, for example 110, including its transmitter 114, control circuitry 116, programmable processor 117, and control software 118 can execute the method 200 and others described herein.

As is seen in FIG. 2, the method 200 can receive power, as in 210. In some embodiments, power can be received from a power source, for example, 112. Optionally, the method 200 can receive user input that selects the mode of a transmitter, for example, 114, as in 220, and then change the mode of the transmitter accordingly, as in 230.

Whether or not the method 200 changes the mode of the transmitter, the method 200 can determine the mode of the transmitter, as in 240, and then determine a MAC OUI and serial number or a plurality of MAC OUI and serial numbers corresponding to the mode of the transmitter, as in 250.

After the appropriate MAC OUI and serial number(s) corresponding to the mode of the transmitter are determined, the method 200 can retrieve those MAC OUI and serial number (s), as in 260. For example, the method 200 can retrieve the MAC OUI and serial number(s) from a database, for example, 120. The retrieved MAC OUI and serial number(s) can be provided to the transmitter, as in 270, and then a signal with the MAC OUI and serial number(s) carried therein can be transmitted as in 280.

Figure 3:
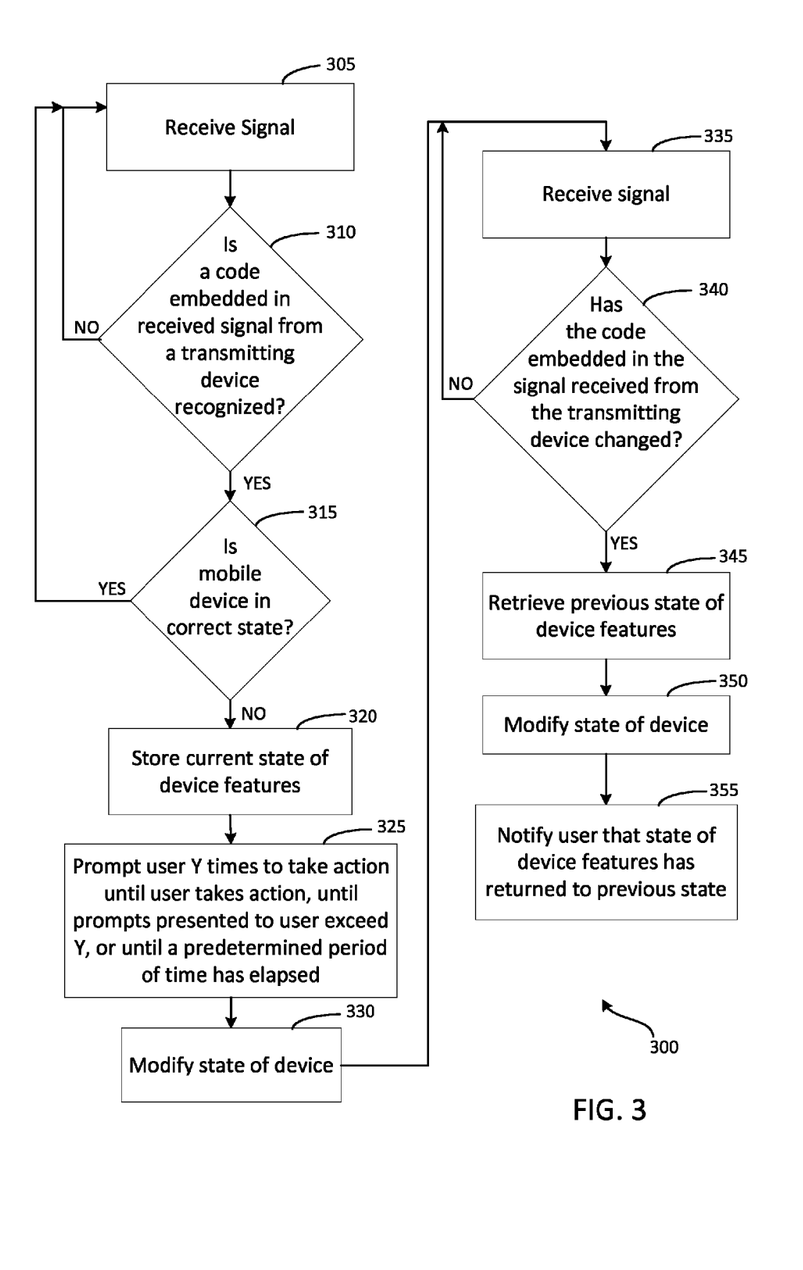
FIG. 3 is a flow chart of a method of receiving a signal and modifying features of a wireless mobile device in accordance with the present invention.

FIG. 3 is a flow chart of a method 300 of receiving a signal and modifying features of a wireless mobile device. A wireless mobile device, for example, 130, including its associated control circuitry 134, programmable processor 135, and control software 136 can execute the method 300 and others described herein.

As seen in FIG. 3, the method 300 can receive a signal from the transmitting device 110, as in 305. In some embodiments, the method 300 can search for a signal from the transmitting device 110 in predetermined time intervals. For example, the method 300 can search for a signal from the transmitting device 110 every X number of seconds.

When a signal is received from the transmitting device 110, the method 300 can determine if a MAC OUI and serial number or address is detected and recognized in the received signal, as in 310. If not, then the method 300 can continue receiving signals, as in 305.

However, if a MAC OUI and serial number or address is detected and recognized in a received signal, as in 310, then the method 300 can determine if the wireless mobile device is in the correct state, as in 315. For example, the MAC OUI and serial number can correspond to specific features of the wireless mobile device that should be enabled or disabled. The method 300 can determine if those specific features are in the correct state for the MAC OUI and serial number detected.

If yes, then nothing further need be done, and the method 300 can continue receiving signals, as in 305. However, if the wireless mobile device is not in the correct state, then the method 300 can store the current state of device features, as in 320. The stored current state can be used later in the method 300 to revert to that state.

After the current state of device features are stored as in 320, the method 300 can prompt a user to take action, as in 325. For example, the method 300 can notify the user of the environment that he or she has entered. In some embodiments, the environment can be determined from the MAC OUI and serial number carried in the signal received from the transmitting device 110, and the method 300 can prompt the user to comply with restrictions of that environment. For example, the method 300 can prompt the user to enable or disable certain features of his or her wireless mobile device. The method can prompt the user a predetermined number of times, for example, Y times.

If the user does not take appropriate action after the predetermined number of prompts and/or if the user does not take appropriate action within a predetermined period of time, then the method 300 can proceed to automatically modify the state of wireless mobile device, as in 330. For example, the method 300 can enable or disable certain features of the wireless mobile device in accordance with the MAC OUI and serial number recognized in the received signal.

A reversion to a previous state may be desired. Accordingly, after the wireless mobile device has been modified as in 330, the method 300 can again receive signals from the transmitting device 110, as in 335. In various embodiments, the method 300 can search for a signal from the transmitting device 110 in predetermined time intervals. For example, the method 300 can search for a signal from the transmitting device 110 every X number of seconds.

When a signal is received from the transmitting device 110, as in 335, the method 300, as in 340, can determine if a MAC OUI and serial number carried in the received signal has changed from the MAC OUI and serial number that was recognized as in 310. If not, then no features need be modified and the method 300 can continue receiving signals, as in 335.

However, when the MAC OUI and serial number carried in a signal received as in 335 has changed from the MAC OUI and serial number that was earlier recognized as in 310, the method 300 can retrieve the previous state of device features as in 345 that were stored as in 320. Then, the method 300 can modify the wireless mobile device as in 350. For example, the method 300 can enable or disable certain features of the wireless mobile device so that the features are in the same state as they were before the method 300 changed those features. Finally, the method 300 can notify the user that the state of the wireless mobile device has returned or reverted to its previous state as in 355.

In some embodiments, the method 300 can notify the user that he or she is leaving a particular environment. For example, the method 300 can determine that a user is leaving the range of a transmitting device 110 when a signal is not received from the transmitting device within a predetermined period of time or when the MAC OUI and serial number recognized in a received signal has changed. In these embodiments, the method 300 can prompt the user to restore features of his or her mobile device to a previous state, that is, the state of the device before the user entered the particular environment. If the user does not comply within a predetermined period of time or after a predetermined number of prompts, then the method 300 can automatically modify the wireless mobile device as in 350.

The systems and methods explained above incorporate a transmission device 110 transmitting a signal, for example, a Bluetooth signal that can be detected by a wireless mobile device 130. However, the present systems and methods can also use GPS or Geo-location tracking technology.

For example, a wireless mobile device 130 can be equipped with a GPS system to determine the location of the device 130. Depending on the location of the device 130, the present systems and methods can determine the environment in which the device 130 is located and control features of the device 130 accordingly.

Similarly, a wireless mobile device 130 can receive signals from a plurality of different cellular towers in range. Then, the present systems and methods can use triangulation methods to determine the location of the device 130. Depending on the location of the device 130, the present systems and methods can determine the environment in which the device 130 is located and control features of the device 130 accordingly.

In addition to controlling features of a wireless mobile device, the present systems and methods can also provide information to a user of a wireless mobile device according to the device location. For example, when the present systems and methods determine that a user of a device has entered a particular store, the systems and methods can present advertising materials, coupons, or marketing materials to the user via his or her device. Similarly, when the present systems and methods determine that a user of a device has exited a particular store, the systems and methods can present to the user, via his or her device, surveys or incentives for returning to the store. If the user's device is linked to an email account, the present systems and methods can also send any of these advertising materials, coupons, marketing materials, surveys, or incentives to the user's email address.

Advantageously, when any features of a wireless mobile device are enabled or disabled, the present systems and methods can provide a user with the ability to override the changes to device features. For example, when the described system or method changes a feature of a wireless mobile device, the user can undo the change even before leaving a particular environment.

Similarly, the described systems and methods can provide, a user of a device with the ability to make emergency telephone calls at all times. For example, even when the ability to make calls is disabled by the described systems and methods, the device can still call "911."

From the foregoing, it will be observed that numerous variations and modifications may be effected without departing from the spirit and scope of the invention. It is to be understood that no limitation with respect to the specific system or method illustrated herein is intended or should be inferred. It is, of course, intended to cover by the appended claims all such modifications as fall within the spirit and scope of the claims.

What is claimed is:

1. A method of controlling features of a wireless mobile device comprising:
    receiving, at the wireless mobile device, a signal, the signal including a MAC OUI and serial number carried therein;
    determining, at the wireless mobile device, if the features of the wireless mobile device are in a correct state in accordance with the MAC OUI and serial number; and
    when the features of the wireless mobile device are not in the correct state, modifying, at the wireless mobile device, at least one feature of the wireless mobile device in accordance with the MAC OUI and serial number.

2. The method of claim 1 further comprising determining if the MAC OUI and serial number in the received signal are recognized.

3. The method of claim 1 further comprising prompting a user to modify the least one feature of the wireless mobile device in accordance with the MAC OUI and serial number before modifying the at least one feature of the wireless mobile device in accordance with the MAC OUI and serial number.

4. The method of claim 3 wherein prompting the user includes notifying the user of a surrounding environment and notifying a user of restrictions in the surrounding environment.

5. The method of claim 1 further comprising storing a state of the features of the wireless mobile device before modifying the at least one feature of the wireless mobile device in accordance with the MAC OUI and serial number.

6. The method of claim 5 further comprising:
    periodically receiving the signal with the MAC OUI and serial number;
    determining when the signal with the MAC OUI and serial number is not received within a predetermined period of time; and
    when the signal with the MAC OUI and serial number is not received within the predetermined period of time, re-modifying the at least one feature of the wireless mobile device.

7. The method of claim 6 wherein re-modifying the at least one feature of the wireless mobile device includes reverting the at least one feature to the stored state of the at least one feature.

8. The method of claim 6 further comprising prompting a user to re-modify the at least one feature of the wireless mobile device.

9. The method of claim 8 wherein prompting the user includes notifying the user of a surrounding environment and notifying the user of a lack of restrictions in the surrounding environment.

10. The method of claim 1 wherein modifying the at least one feature of the wireless mobile device in accordance with the MAC OUI and serial number includes enabling the at least one feature or disabling the at least one feature.

11. The method of claim 1 wherein the MAC OUI and/or serial number include a twelve-digit hexadecimal number.

12. The method of claim 1 wherein receiving the signal includes receiving a GPS location of the wireless mobile device.

13. The method of claim 1 wherein receiving the signal includes receiving triangulation data from a plurality of cellular towers in range.

14. The method of claim 1 wherein modifying the least one feature of the wireless mobile device in accordance with the MAC OUI and serial number includes providing at least one of advertising materials, coupons, marketing materials, and surveys to a user of the wireless mobile device.

15. The method of claim 1 further comprising overriding the modification of the at least one feature of the wireless mobile device.

16. The method of claim 15 further comprising prohibiting overriding in the absence of an emergency situation.

17. The method of claim 1, wherein the at least one feature is a non-network related feature.

18. A method of controlling features of a wireless mobile device comprising:
    determining, at a transmission device, a transmission mode and/or a device class of the transmission device;
    determining, at the transmission device, one or more MAC OUI and serial numbers corresponding to the transmission mode and/or the device class, wherein each of the one or more MAC OUI and serial numbers also corresponds to controlling one or more associated predetermined features of the wireless mobile device; and
    transmitting, from the transmission device, a signal, the signal including at least one of the one or more MAC OUI and serial numbers carried therein,
    wherein the transmission device and the wireless mobile device are separate devices.

19. The method of claim 18 wherein transmitting the signal includes transmitting a Bluetooth signal, a WiFi signal, or a signal with a unique MAC OUI and serial number carried therein.

20. The method of claim 18 wherein transmitting the signal includes transmitting the signal with a MAC address carried therein.

21. The method of claim 18 wherein determining the transmission mode and/or the device class includes determining a surrounding environment.

22. The method of claim 21 wherein determining the transmission mode and/or the device class includes controlling transmission of the signal according to parameters of the surrounding environment.

23. The method of claim 21 wherein determining the transmission mode and/or the device class includes determining a transmission radius based on the surrounding environment.

24. A transmission device comprising:
    a transmitter;
    executable control software stored on a non-transitory computer readable storage medium; and
    at least one programmable processor for:
        determining a transmission mode and/or class of the transmitter;
        determining one or more MAC OUI and serial numbers corresponding to the transmission mode and/or class of the transmitter, wherein each of the one or more MAC OUI and serial numbers also corresponds to controlling one or more associated predetermined features of a separate wireless mobile device; and
        providing a signal to the transmitter for transmission, the signal including at least one of the one or more MAC OUI and serial numbers carried therein.

25. The transmission device of claim 24 wherein the transmitter transmits a Bluetooth signal, a WiFi signal, or a signal with a unique MAC OUI and serial number carried therein.

26. The transmission device of claim 24 wherein the transmitter transmits a signal with a MAC address carried therein.

27. The transmission device of claim 24 further comprising a user-operable input device for selecting the transmission mode of the transmitter.

28. The transmission device of claim 27 further comprising a database for storing the one or more MAC OUI and serial numbers.

29. The transmission device of claim 28 wherein the programmable processor retrieves the one more MAC OUI and serial numbers from the database based on the transmission mode of the transmitter.

30. The transmission device of claim 24 further comprising a power supply.

31. The transmission device of claim 24 wherein each of the one or more MAC OUI and serial numbers corresponds to controlling a predetermined feature of a remote wireless mobile device.

32. The transmission device of claim 24 wherein the transmission mode of the transmitter corresponds to a transmission radius of the transmitter.

* * * * *